Aug. 31, 1943.   J. DE STEFANO   2,328,305
AIRCRAFT WINDSHIELD SAFETY GUARD
Filed March 16, 1942
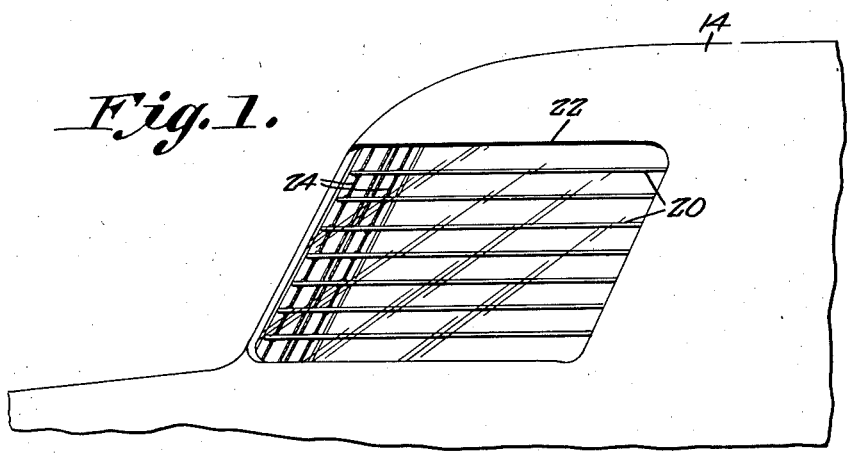
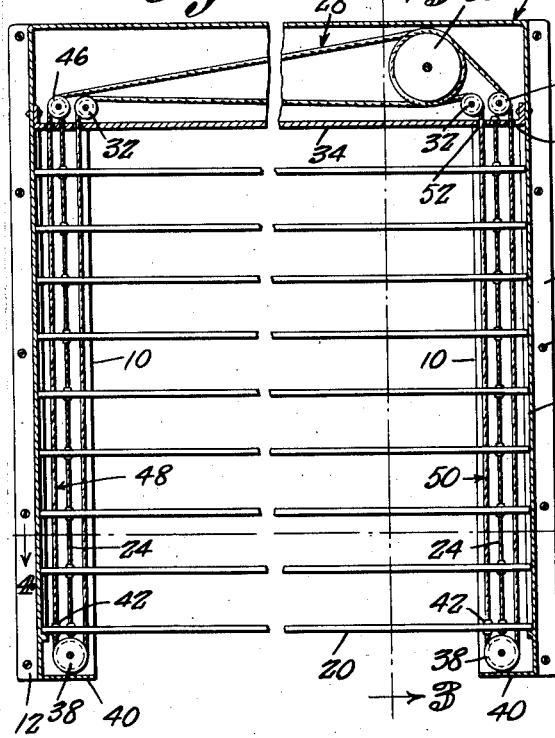
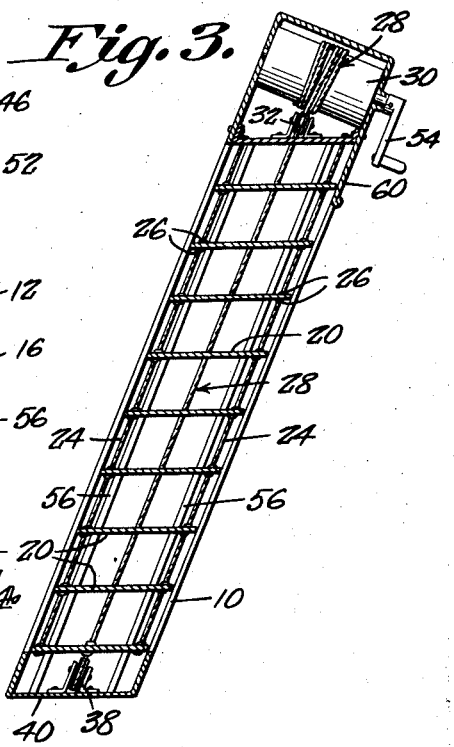
John DeStefano,
INVENTOR.
BY
Victor J. Evans & Co.
ATTORNEYS Patented Aug. 31, 1943

2,328,305

UNITED STATES PATENT OFFICE 2,328,305

AIRCRAFT WINDSHIELD SAFETY GUARD

John De Stefano, Jackson Heights, N. Y.

Application March 16, 1942, Serial No. 434,972

2 Claims. (Cl. 160—170)

My invention relates to aircraft windshields, and has among its objects and advantages the provision of an improved safety guard located adjacent the inner face of the windshield for the protection and safety of the flight crew against the entry of foreign bodies, as birds in flight.

In the accompanying drawing:

Figure 1 is an elevational view of a portion of an airplane body and its windshield illustrating my invention applied thereto;

Figure 2 is an enlarged inside elevational view of the safety guard partly in section;

Figure 3 is a sectional view taken along the line 3—3 of Figure 2; and

Figure 4 is a sectional view taken along the line 4—4 of Figure 2.

In the embodiment selected for illustration, I make use of two channel members 10 opening in the direction of each other and arranged in parallelism, with each channel having a flange 12 through the medium of which the channels may be secured to the body structure 14 by screws or bolts 16. A housing 18 interconnects the upper ends of the channels 10. A series of metal plates 20 is arranged transversely of the channels 10 and are set edgewise to the windshield 22. The plates 20 lie horizontally and are positioned parallel to the line of vision of the pilot. In this position, the plates provide maximum resistance and minimum interference to visibility. The impact of a body striking the external face of the windshield will be exerted against the edges of the plates 20.

The end margins of the plates 20 are slidably guided in the channels 10, and the plates are connected one with the other at uniformly spaced intervals through the medium of two cables 24 at both ends of the plates. These cables are attached to the plates, as at 26, and the cables are located close to the longitudinal edge margins of the plates so as to more effectively balance the plates in horizontal planes. Openings are provided in the plates 20 through which the cables 24 are threaded and the connections 26 may comprise welded joints.

Means for raising and lowering the plates 20 comprises a cable 28 wound a few times about a spool 30 to secure a good hold on the spool. The cable passes around grooved sheaves 32 mounted on the bottom wall 34 of the housing 18 and passes loosely through openings 36 in the plates 20. The cable passes around grooved sheaves 38 mounted on plates 40 secured to the lower ends of the channels 10. The cable is then attached at 42 to the lower plate 20 and passes through openings 44 in the plates and upwardly around grooved sheaves 46 mounted on the wall 34 and back to the spool 30. The cable 28 passes loosely through the openings 36 and 44 so that when the outside run 48 and the inside run 50 are moved upwardly through rotation of the spool 30 the plates 20 will be lifted upwardly and nested in face to face relationship adjacent the wall 34. Openings 52 are provided in the wall 34 for loosely receiving the cable 28, and the upper ends of the cables 24 are attached to the wall 34.

To one end of the spool 30 is connected a crank 54 to facilitate rotation of the spool 30. Thus the plates 20 may be elevated to an inoperative position through rotation of the spool 30 in one direction and lowered to the operative position of Figures 2 and 3 through rotation of the spool in the opposite direction.

Figure 4 illustrates the channels 10 as being provided with ribs 56 riding in notches 58 in the ends of the plates 20 to restrain the plates from rotation about their longitudinal axes when an impact is exerted against the windshield. All the plates have a dull finish to eliminate glare. The housing 18 is provided with a depending wall 60 which shields the plates 20 from view when they are elevated to an inoperative position.

Without further elaboration, the foregoing will so fully illustrate my invention, that others may, by applying current knowledge, readily adapt the same for use under various conditions of service.

I claim:

1. A guard device for a windshield comprising a pair of channels opening in the direction of each other and adapted to parallel a windshield, a housing at the upper end of the channels, a plurality of plates having their ends slidably guided in the channels adapted for positioning adjacent and edgewise to the windshield, flexible lines connecting said plates one with the other at spaced intervals, a rotary spool mounted in the housing, a cable wound on said spool and operatively connected with said plates for raising the same from spaced apart to nested relationship, said cable extending through openings in the plates and attached to the lowermost plate, a depending plate on said housing masking the plates in nested arrangement, and means on said channels and plates to restrain turning of the plates about their longitudinal axes.

2. In a guard device for a windshield, a pair of parallel spaced guide members, a cross member at the upper end of the guide members, a plurality of plates having their ends slidably fitted in the guide members and adapted for positioning adjacent and edgewise to a windshield, flexible lines connecting said plates one with the other at spaced intervals, a rotary spool mounted on the cross member, a cable wound on said spool and extending through openings in said plates, the said cable being trained over a pulley mounted at the bottom of each guide member, the said cable being attached to the lowermost plate for selectively raising the plates from depending spaced apart positions to elevated closely nested arrangement, and means on the guide members and the ends of the plates for restraining turning movement of the plates about their longitudinal axes.

JOHN DE STEFANO.